Patented Dec. 1, 1942

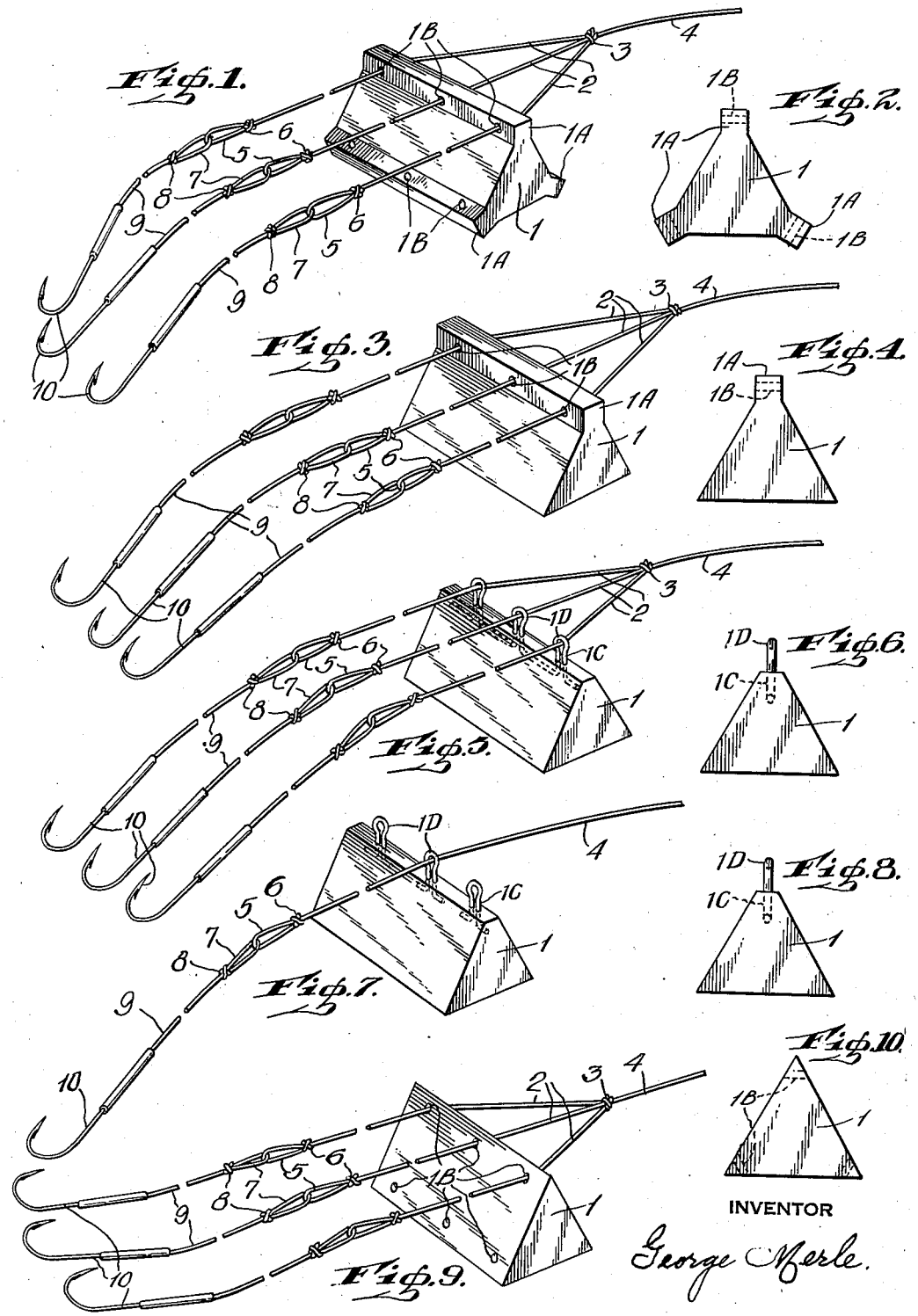

2,303,753

UNITED STATES PATENT OFFICE 2,303,753

SINKER FOR FISHING LINES

George Merle, Brooklyn, N. Y.

Application November 18, 1941, Serial No. 419,599

13 Claims. (Cl. 43—27)

This invention relates to the merchandising of fishing lines having one or more fish hooks attached thereto, and particularly to the provision of an improved sinker adapted to be loosely or slideably mounted on the fiishing line.

The object of this invention is to provide a sinker of any shape or form having a plurality of blades or fins molded thereon a plurality of openings in each blade or fin and in case one blade or fin becomes damaged either one of the other blades or fins may be used, furthermore a plurality of predetermined lengths of line are secured to the end of a fishing line, the free end of the lines are passed loosely through the respective openings in one of the blades or fins of the sinker, the free end of the lines are formed to provide loops the knots created thereby act as stops and prevents the sinker from becoming separated from the fishing line and to each loop a snelled fish hook is attached. In the operation of this invention the fishing line with baited hooks attached and sinker is thrown or dropped into a stream of water and when the sinker rests on the bed of the stream the operator draws the fishing line taut thereby the stop knots are positioned against the sinker and when the line is released the running water or current carries the lines away from the sinker, this back and forth motion is very important in the art of catching fish as it keeps the operator on the alert with the expectation of getting a bite or strike and through the entire operation this improved sinker remains motionless on the bed of the stream; in prior art the sinker is secured to the fishing line and the back and forth motion of the sinker to and from the bed of the stream in the expectation of getting a bite or strike scares the fish away from the baited fish hooks.

Another object is to provide a sinker of any shape or form having a single blade or fin molded thereon and the blade or fin having a plurality of openings, a plurality of predetermined lengths of line are secured to the end of a fishing line, the free end of the lines are passed loosely through the respective openings in the blade or fin of the sinker, the free end of the lines are formed to provide loops, the knots created thereby act as stops and prevents the sinker from becoming separated from the fishing line and to each loop a snelled fish hook is attached; or a fishing line passed loosely through the center opening in the blade or fin of the sinker, the free end of the fishing line is formed to provide a loop the knot created thereby acts as a stop and prevents the sinker from becoming separated from the fishing line and to the loop a snelled fish hook is attached. This method of an ordinary fishing line passing through the center opening of the sinker allows the fishing line with the fish hook attached to travel any distance at the will of the operator.

Another object is to provide a sinker of any shape or form having a plurality of eyes or openings fashioned from a length of wire and molded or securely mounted on the sinker, a plurality of predetermined lengths of line secured to a fishing line, the free end of the lines passed loosely through the respective openings in the sinker, the free end of the lines are formed to provide loops, the knots created thereby act as stops and prevents the sinker from becoming separated from the fishing line and to each loop a snelled fish hook is attached; or a fishing line passed loosely through the center opening or eye securely mounted on the sinker, the free end of the fishing line is formed to provide a loop the knot created thereby acts as a stop and prevents the sinker from becoming separated from the fishing line and to the loop a snelled fish hook is attached.

Another object is to provide a sinker consisting of an elongated triangular body having a plurality of openings equally spaced along the body adjacent each vertex of the triangle, a plurality of predetermined lengths of line secured to a fishing line the free end of the lines passed loosely through the respective openings adjacent any vertex of the triangular body, the free end of the lines are formed to provide loops, the knots created thereby act as stops and prevent the sinker from becoming separated from the fishing line and to each loop a snelled fish hook is attached.

Another object is to provide a sinker of any shape or form and means therein or thereon for the reception of a plurality of predetermined lengths of line secured to a fishing line the free end of the lines passed loosely through the respective openings in or on the sinker, the free end of the lines are formed to provide loops, the knots created thereby act as stops and prevents the sinker from becoming separated from the fishing line and to each loop a snelled fish hook is attached; or a fishing line passed loosely through an opening in or on the sinker, the free end of the fishing line is formed to provide a loop the knot created thereby acts as a stop and prevents the sinker from becoming separated from the fishing line and to the loop a snelled fish hook is attached; and with these and other objects in view, the invention consists in a sinker and method of merchandising fishing lines, which is simple in construction and which is hereinafter more fully described and claimed.

The invention is fully disclosed in the following specification, of which the accompanying drawing forms a part, in which the separate parts of my improvement are designated by suitable reference characters in each of the views, and in which—

Fig. 1 is a perspective view of a sinker with a plurality of lines and fish hooks attached and secured to a fishing line and constructed in accordance with my invention; Fig. 2 is an end elevation thereof.

Fig. 3 is a view similar to Fig. 1 but showing a modification; Fig. 4 is an end elevation thereof.

Fig. 5 is a view similar to Fig. 3 but showing a modification; Fig. 6 is an end elevation thereof.

Fig. 7 is a view same as Fig. 5 but showing a different manner of operation; Fig. 8 is an end elevation thereof.

Fig. 9 is a view similar to Fig. 1 showing a modification; Fig. 10 is an end elevation thereof.

Referring to the drawing in detail, reference character I designates a metal elongated triangular body in Figs. 1—3—5—7—9 and having a plurality of blades or fins at IA in Fig. 1 and also a single blade or fin at IA in Fig. 3 and being an integral part of the body; a plurality of openings in each blade or fin at IB of Figs. 1 and 3, at IB of Fig. 9 and at ID of Fig. 5; at 2 in Figs. 1—3—5—9 a plurality of predetermined lengths of line at 3 are secured to the fishing line 4, the lines 2 adapted to be passed loosely through the openings IB of Figs. 1—3—9 and openings ID of Fig. 5. The free end of the lines 2 formed to provide loops 5 and the knots 6 created thereby act as stops and prevents the sinker from becoming separated from the fishing line 4; the snells 9 secured to fish hooks 10 have a loop 7 and a knot 8 and are attached to loops 5 of lines 2. Figs. 5 and 7 show a length of wire fashioned to provide a plurality of openings or eyes ID molded on the body I, Fig. 7 shows a fishing line 4 adapted to be passed loosely through the center opening or eye ID, the free end of the fishing line provided with a loop 5 and knot 6, the knot 6 created thereby acts as a stop and prevents the sinker from becoming separated from the fishing line 4; the snell 9 secured to fish hook 10 has a loop 7 and a knot 8 and is attached to loop 5 of the fishing line 4. Fig. 9 shows a metal elongated triangular body I, having a plurality of openings IB equally spaced along the body adjacent each vertex of said body I.

Having fully described my invention, what I claim as new and desire to secure by Letters Patent is:

1. A fishing device comprising an elongated sinker, having a plurality of blades which are an integral part of the sinker, the blades having a plurality of equally spaced openings; a plurality of lines of predetermined length, one set of ends of the lines being secured to a fishing line, the free end of the lines passing loosely through the respective openings in one of the blades of the sinker, loops on the free ends of the lines, knots on the lines intermediate the loops and the sinker, the knots connecting the loops to the lines and forming stops to prevent the sinker from becoming separated from the fishing line, and a snelled fish hook attached to each loop.

2. A fishing device comprising an elongated sinker, having a plurality of eyes securely mounted on the sinker, a plurality of lines of predetermined length, one set of ends of the lines being secured to a fishing line, the free end of the lines passing loosely through the respective eyes on the sinker, loops on the free ends of the lines, knots on the lines intermediate the loops and the sinker, the knots connecting the loops to the lines and forming stops to prevent the sinker from becoming separated from the fishing line, and a snelled fish hook attached to each loop.

3. A fishing device comprising an elongated sinker, having a plurality of eyes securely mounted on the sinker, a fishing line passing loosely through the center eye on the sinker, a loop on the free end of the line, a knot on the line intermediate the loop and the sinker, the knot connecting the loop to the line and forming a stop to prevent the sinker from becoming separated from the fishing line, and a snelled fish hook attached to the loop.

4. A fishing device comprising an elongated triangular sinker, having a plurality of openings equally spaced along the sinker adjacent each vertex of the respective triangle of the sinker, a plurality of lines of predetermined length, one set of ends of the lines being secured to a fishing line, the free end of the lines passing loosely through the respective openings in the sinker, loops on the free ends of the lines, knots on the lines intermediate the loops and the sinker, the knots connecting the loops to the lines and forming stops to prevent the sinker from becoming separated from the fishing line, and a snelled fish hook attached to each loop.

5. A fishing device comprising a sinker, a plurality of lines of predetermined length, one set of ends of the lines being secured to a fishing line, means for connecting the lines of predetermined length to a sinker, the lines passing loosely through the means, loops on the free ends of the lines, knots on the lines intermediate the loops and the sinker, the knots connecting the loops to the lines and forming stops to prevent the sinker from becoming separated from the fishing line, and a snelled fish hook attached to each loop.

6. A fishing device comprising a sinker, a plurality of lines of predetermined length, one set of ends of the lines being secured to a fishing line, means for connecting the lines of predetermined length on a sinker, the lines passing loosely through the means, loops on the free ends of the lines, knots on the lines intermediate the loops and the sinker, the knots connecting the loops to the lines and forming stops to prevent the sinker from becoming separated from the fishing line, and a snelled fish hook attached to each loop.

7. A fishing device comprising a sinker, means for connecting a fishing line on a sinker, the fishing line passing loosely through the means, a loop on the free end of the line, a knot on the line intermediate the loop and the sinker, the knot connecting the loop to the line and forming a stop to prevent the sinker from becoming separated from the fishing line, and a snelled fish hook attached to each loop.

8. In an article of manufacture, a fishing device comprising an elongated sinker, having a plurality of blades which are an integral part of the sinker, the blades having a plurality of equally spaced openings, a plurality of lines of predetermined length, one set of ends of the lines being secured to a fishing line, the free end of the lines passing loosely through the respective openings in one of the blades of the sinker, loops on the free ends of the lines, knots on the lines intermediate the loops and the sinker, the knots connecting the loops to the lines and forming stops to prevent the sinker from becoming separated from the fishing line, and a snelled fish hook attached to each loop.

9. In an article of manufacture, a fishing device comprising an elongated sinker, having a plurality of eyes securely mounted on the sinker, a plurality of lines of predetermined length, one set of ends of the lines being secured to a fishing line, the free end of the lines passing loosely through the respective eyes on the sinker, loops on the free ends of the lines, knots on the lines intermediate the loops and the sinker, the knots connecting the loops to the lines and forming stops to prevent the sinker from becoming separated from the fishing line, and a snelled fish hook attached to each loop.

10. In an article of manufacture, a fishing device comprising an elongated sinker, having a plurality of eyes securely mounted on the sinker, a fishing line passing loosely through the center eye on the sinker, a loop on the free end of the line, a knot on the line intermediate the loop and the sinker, the knot connecting the loop to the line and forming a stop to prevent the sinker from becoming separated from the fishing line, and a snelled fish hook attached to the loop.

11. In an article of manufacture, a fishing device comprising an elongated triangular sinker, having a plurality of openings equally spaced along the sinker adjacent each vertex of the respective triangle of the sinker, a plurality of lines of predetermined length, one set of ends of the lines being secured to a fishing line, the free end of the lines passing loosely through the respective openings in the sinker, loops on the free ends of the lines, knots on the lines intermediate the loops and the sinker, the knots connecting the loops to the lines and forming stops to prevent the sinker from becoming separated from the fishing line, and a snelled fish hook attached to each loop.

12. In an article of manufacture, a fishing device comprising a sinker, a plurality of lines of predetermined length, one set of ends of the lines being secured to a fishing line, means for connecting the lines of predetermined length to a sinker, the lines passing loosely through the means, loops on the free ends of the lines, knots on the lines intermediate the loops and the sinker, the knots connecting the loops to the lines and forming stops to prevent the sinker from becoming separated from the fishing line, and a snelled fish hook attached to each loop.

13. In an article of manufacture, a fishing device comprising a sinker, a plurality of lines of predetermined length, one set of ends of the lines being secured to a fishing line, means for connecting the lines of predetermined length on a sinker, the lines passing loosely through the means, loops on the free ends of the lines, knots on the lines intermediate the loops and the sinker, the knots connecting the loops to the lines and forming stops to prevent the sinker from becoming separated from the fishing line, and a snelled fish hook attached to each loop.

GEORGE MERLE.